(12) United States Patent
Stuedemann et al.

(10) Patent No.: US 7,367,589 B2
(45) Date of Patent: May 6, 2008

(54) COLLAPSIBLE STEERING ASSEMBLY WITH A STATIONARY REACTION SURFACE

(75) Inventors: Richard Stuedemann, Ortonville, MI (US); William J Elliot, Commerce, MI (US); Keith Jensen, Shelby Township, MI (US); Leonid Smorgonsky, West Bloomfield, MI (US); William A Jolley, West Bloomfield, MI (US); Travis D Bechtel, Goodrich, MI (US)

(73) Assignee: Chrysler LLC, Auburn Hills, MI (US)

( * ) Notice: Subject to any disclaimer, the term of this patent is extended or adjusted under 35 U.S.C. 154(b) by 278 days.

(21) Appl. No.: 11/182,605

(22) Filed: Jul. 15, 2005

(65) Prior Publication Data

US 2007/0013180 A1    Jan. 18, 2007

(51) Int. Cl.
*B62D 1/18* (2006.01)
(52) U.S. Cl. .................... 280/777; 280/775; 74/493
(58) Field of Classification Search ........... 280/777, 280/775; 74/493
See application file for complete search history.

(56) References Cited

U.S. PATENT DOCUMENTS

| | | | | |
|---|---|---|---|---|
| 4,452,096 A | * | 6/1984 | Workman | 74/492 |
| 5,503,431 A | * | 4/1996 | Yamamoto | 280/777 |
| 5,520,416 A | * | 5/1996 | Singer et al. | 280/775 |
| 5,609,063 A | * | 3/1997 | Hedderly et al. | 74/492 |
| 5,704,641 A | * | 1/1998 | Shimizu et al. | 280/775 |
| 5,722,299 A | * | 3/1998 | Yamamoto et al. | 74/493 |
| 5,819,592 A | * | 10/1998 | Lewandowski et al. | 74/492 |
| 5,845,936 A | * | 12/1998 | Higashino | 280/775 |
| 5,927,152 A | * | 7/1999 | Marzio et al. | 74/493 |
| 5,944,348 A | * | 8/1999 | Boyle et al. | 280/777 |
| 6,523,432 B1 | * | 2/2003 | Yamamoto et al. | 74/492 |
| 6,948,741 B2 | * | 9/2005 | Manwaring et al. | 280/775 |
| 7,178,833 B2 | * | 2/2007 | Cymbal et al. | 280/777 |

* cited by examiner

*Primary Examiner*—Eric Culbreth
*Assistant Examiner*—Leonard McCreary, Jr.
(74) *Attorney, Agent, or Firm*—Ralph E. Smith

(57) ABSTRACT

A vehicle steering assembly includes a steering column having a forward section and a rearward section movable relative to the forward section, a mounting plate adapted to be carried by the vehicle and a bracket releasably coupled to the mounting plate, and operably coupled to the rearward section of the steering column for movement therewith. The assembly also includes a stationary reaction surface disposed adjacent to the rearward section of the steering column and adapted to be engaged by the steering column during at least some events wherein the rearward section is displaced relative to the forward section. This maintains the position of a reaction force on the steering column during movement of the rearward section of the steering column, which provides a decreasing reaction force on the steering column.

3 Claims, 3 Drawing Sheets

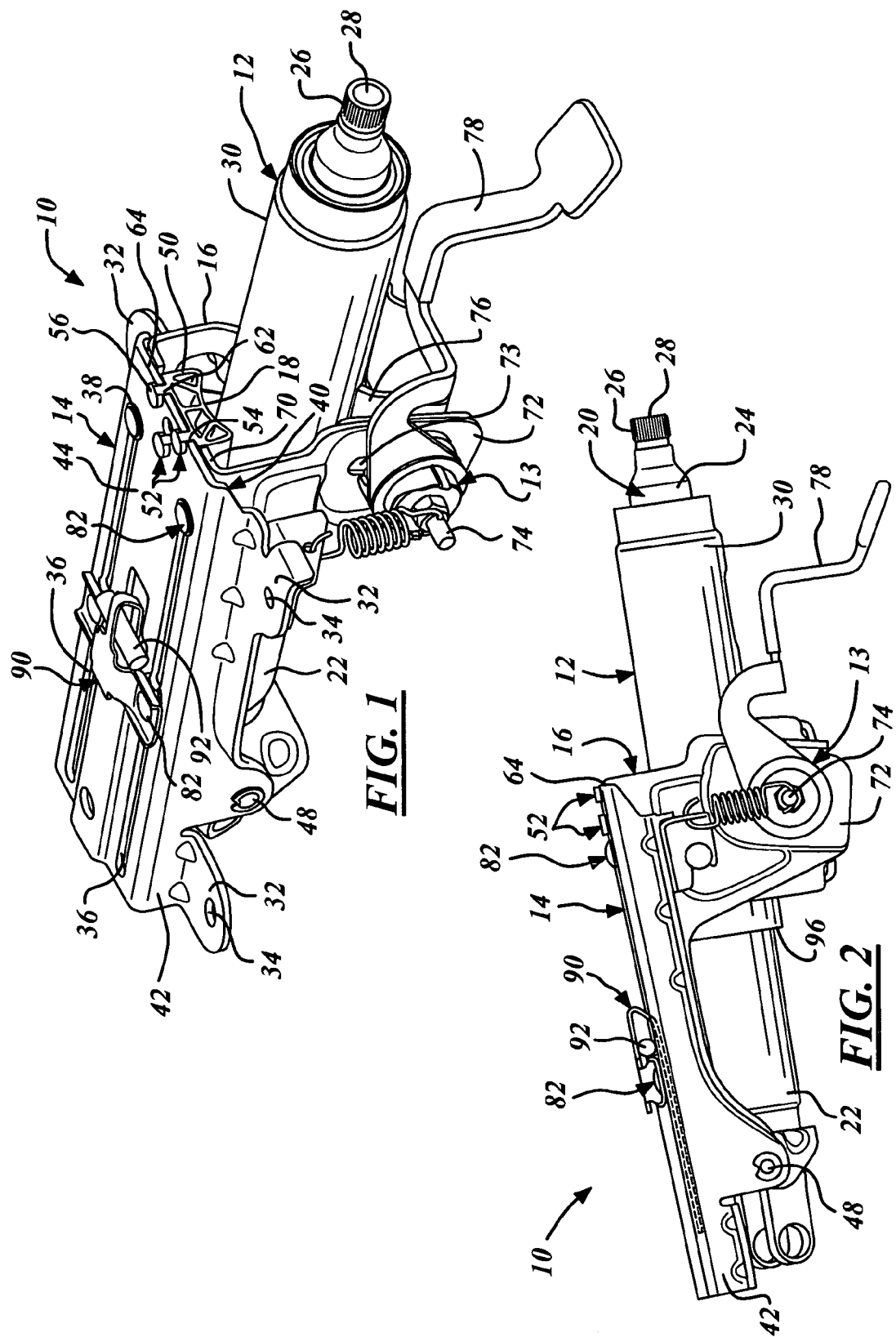

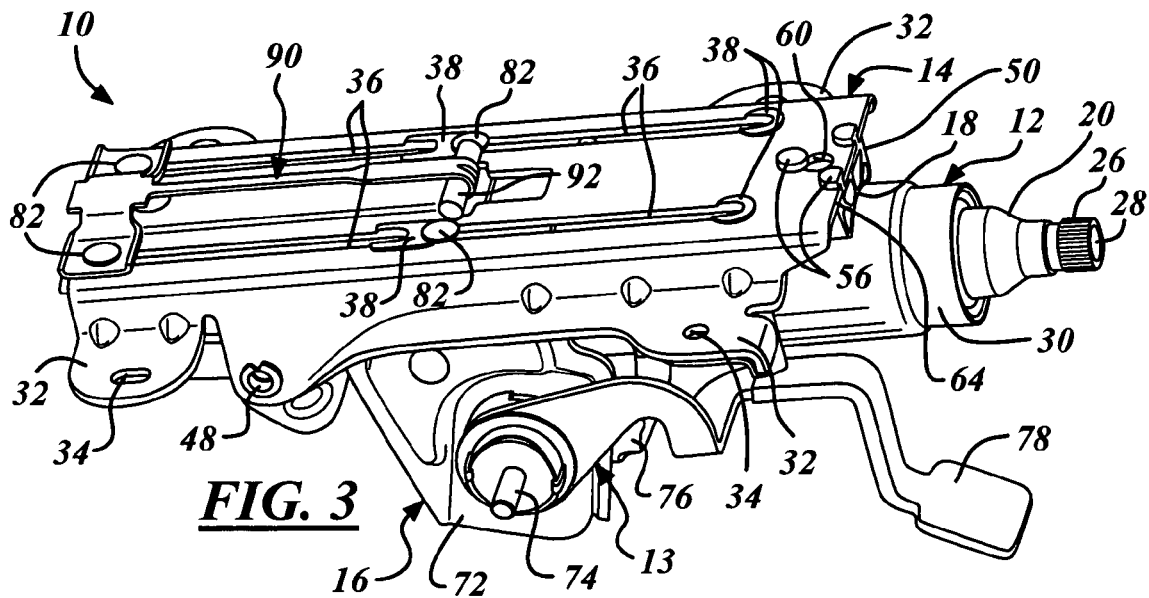
FIG. 3
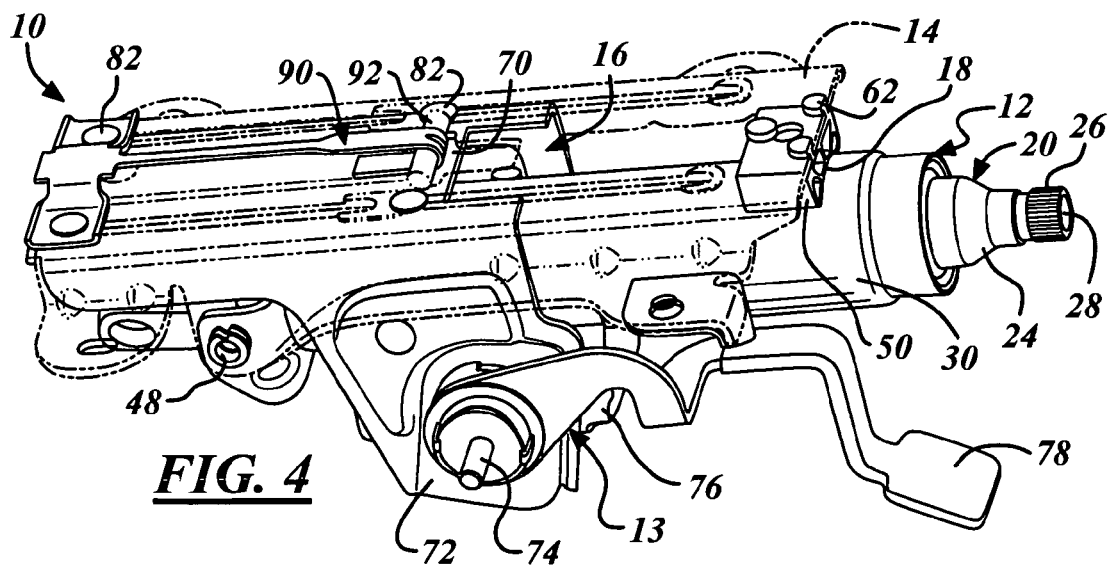
FIG. 4
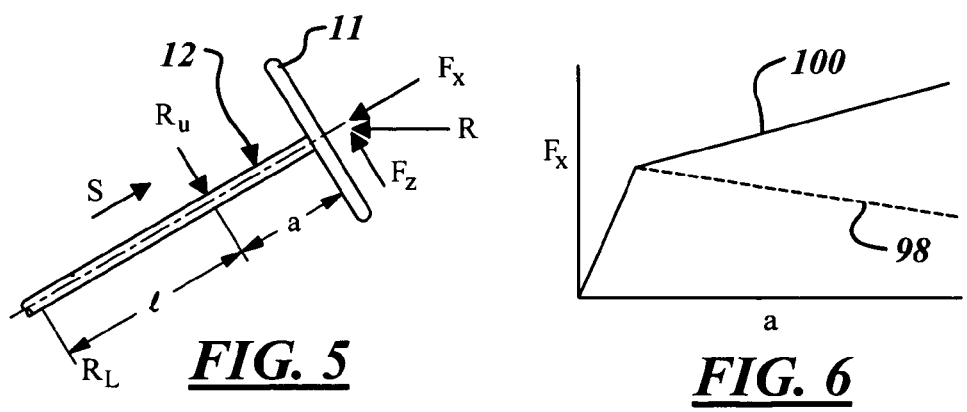
FIG. 5
FIG. 6

US 7,367,589 B2

COLLAPSIBLE STEERING ASSEMBLY WITH A STATIONARY REACTION SURFACE

FIELD OF THE INVENTION

The present invention relates generally to vehicle steering assemblies, and more particularly to a collapsible steering assembly.

BACKGROUND OF THE INVENTION

A steering column of a vehicle typically is secured to the frame of the automobile to facilitate safe operation of the automobile. Generally, this is accomplished by bolting the steering column to the instrument panel which may be further secured to the frame of the automobile. However, it can be desirable to allow the steering column to disengage from or move relative to the instrument panel, such as by permitting the steering column to collapse or be displaced, upon the application of a force during an accident.

To permit movement of the steering column under sufficient force, polymer capsules have been proposed to support a mounting bracket of the steering column and are designed in such a way as to break-away under a given force. Thus, the steering column is allowed to axially collapse or move upon the application of a sufficient force in the event of an accident. Some steering assemblies include a tilt mechanism that permits adjustment of the angle of the steering column.

SUMMARY OF THE INVENTION

A vehicle steering assembly includes a steering column having a forward section and a rearward section movable relative to the forward section, a mounting plate adapted to be carried by the vehicle and a bracket releasably coupled to the mounting plate, and operably coupled to the rearward section of the steering column for movement therewith. The assembly also includes a stationary reaction surface disposed adjacent to the rearward section of the steering column and adapted to be engaged by the steering column during at least some events wherein the rearward section is displaced relative to the forward section. This maintains the position of a reaction force on the steering column during movement of the rearward section of the steering column, which provides a decreasing reaction force on the steering column.

In one presently preferred implementation, the steering column is mounted to the bracket by a tilt mechanism to permit adjustment of the angular position of the steering column within the vehicle. The stationary reaction surface is disposed between the steering column and the mounting plate and is positioned so that the reaction surface provides an upper limit on the adjustment of the steering column angle. This ensures that the reaction surface will be engaged by the steering column should a lock of the tilt mechanism be overcome by a sufficient force applied to the steering column.

BRIEF DESCRIPTION OF THE DRAWINGS

These and other objects, features and advantages of the present invention will be apparent from the following detailed description of the preferred embodiments and best mode, appended claims and accompanying drawings in which:

FIG. 1 is a perspective view of one embodiment of a steering assembly showing a steering column in its extended position;

FIG. 2 is a side view of the steering assembly of FIG. 1;

FIG. 3 is a perspective view of the steering assembly shown in a collapsed position;

FIG. 4 is a perspective view with a mounting plate shown in phantom to illustrate other components of the steering assembly;

FIG. 5 is a diagrammatic view of a steering column and steering wheel illustrating various force vectors;

FIG. 6 is a graph illustrating the force trend on a steering assembly over the stroke distance of the steering assembly during a steering column collapse.

DETAILED DESCRIPTION OF PREFERRED EMBODIMENTS

Figure 7:
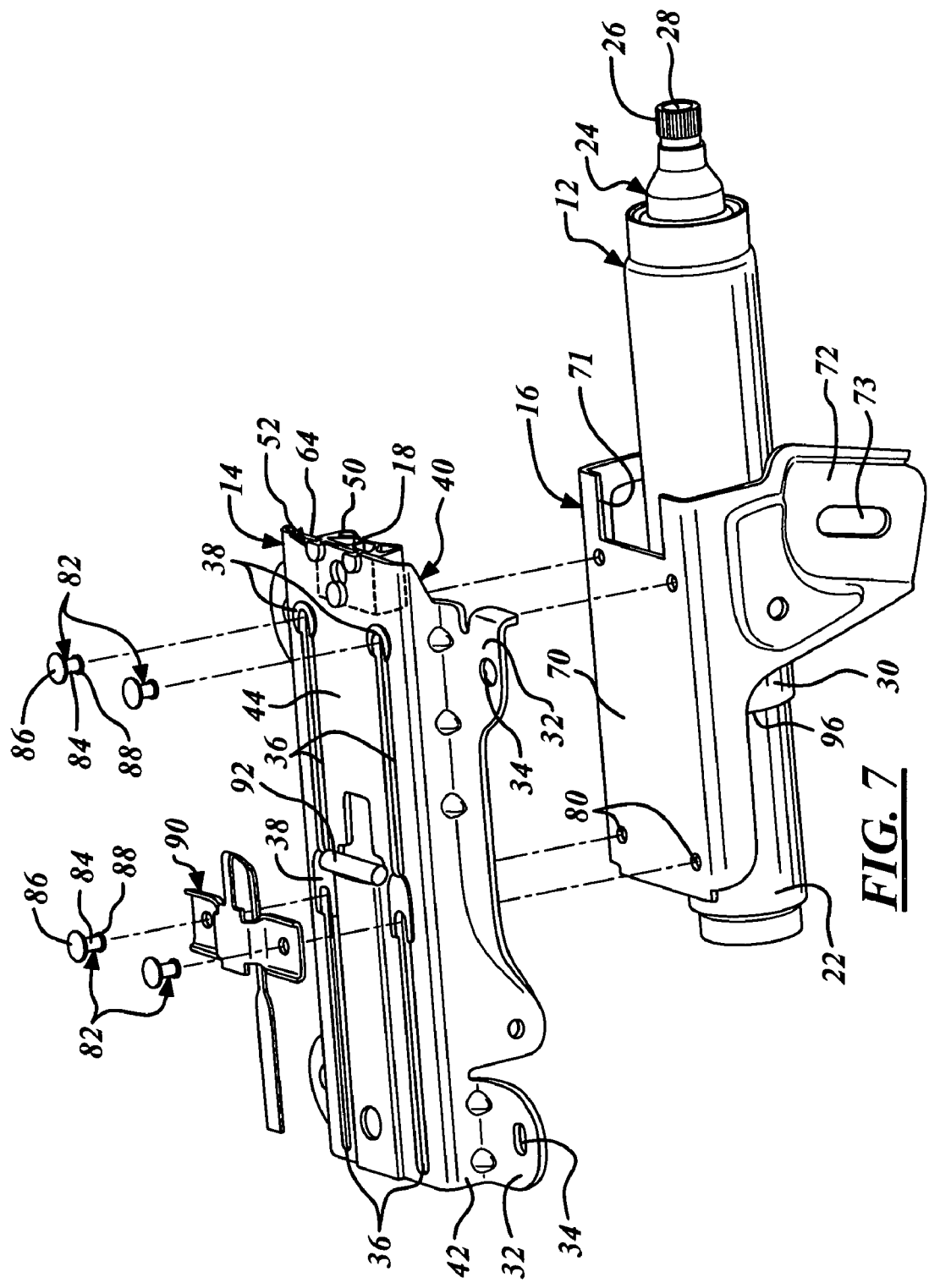
FIG. 7 is an exploded perspective view showing portions of the steering assembly without, for example, a tilt mechanism and associated pivot mount.

Referring in more detail to the drawings, FIG. 1 illustrates a vehicle steering assembly 10 having an energy absorbing support that permits a portion of the steering assembly 10 to collapse or move when sufficient force is applied thereto. The steering assembly 10 includes a steering wheel 11 (FIG. 5) connected to a steering column 12 that is carried by the vehicle preferably by a tilt mechanism 13. The support system includes a mounting plate 14 secured to the vehicle, preferably beneath an instrument panel on the driver side of the vehicle, and a bracket 16 moveably coupled to the mounting plate 14 and adapted to support a portion of the steering column 12. A stationary reaction surface 18 is carried by the mounting plate 14 and is adapted to be engaged by the steering column 12 in certain impact events to control the loads on the steering column as it moves or collapses from its extended position shown in FIGS. 1 and 2, to its collapsed position shown in FIGS. 3 and 4, as will be discussed in more detail below.

The steering column 12 includes a jacket and shaft assembly with a central shaft 20, and forward and rearward sections 22, 24, respectively. The forward section 22 preferably includes a lower jacket 22a and a lower spindle (not shown). The rearward section 24 preferably includes an upper spindle 24a, teeth or splines 26 on an end 28 of the upper spindle 24a on which the steering wheel 11 is received, and an upper jacket 30 disposed over the upper spindle 24a. The upper spindle 24a and upper jacket 30 are slidably movable relative to the lower jacket 22a when a sufficiently high force is applied to the upper spindle 24a, and such force typically is applied through the steering wheel 11.

The mounting plate 14 preferably includes one or more outwardly extending flanges 32 each having one or more openings 34 through which suitable fasteners may be used to attach the mounting plate 14 to a portion of the vehicle, such as an instrument panel of the vehicle. The mounting plate 14 also includes one or more elongated slots 36 that extend generally parallel to the axis of the steering column 12 in assembly. Adjacent a portion of each slot 36, a raised contact surface 38 is provided so that adjacent to the slots 36 the mounting plate 14 has an increased thickness in the area of the contact surface 38. Desirably, the contact surface 38 adjacent each slot 36 is formed at one end of the slot, such as the rearward ends, and may extend partially around an end of the slot, as best shown in FIG. 3. Except for the area of the contact surface 38, the thickness of the mounting plate 14 surrounding the periphery of the slots 36 preferably is generally uniform and less than that in the area of the contact surfaces 38. The mounting plate 14 may include a channel 40 defined by sidewalls 42 on opposed sides of central portion 44 in which the slots 36 are formed. The sidewalls 42, or a flange extending from the sidewalls 42 may include an opening in which a pivot connector 48 is received. The pivot connector 48 (which may include a rivet or other fastener) connects the lower jacket 22a of the steering column 12 with the mounting plate and provides a fixed pivot point about which the steering column 12 pivots when the tilt mechanism 13 is actuated to adjust the angular position of the steering column 12, as will be discussed in more detail below. In this manner, the lower jacket 22a of the steering column 12 is fixed to the mounting plate 14.

The stationary reaction surface 18 is disposed adjacent to the upper spindle 24a of the steering column 12 and preferably is carried by the mounting plate 14 between the mounting plate 14 and the upper jacket 30 of the steering column 12. The reaction surface 18 may be defined by a block 50 fixed to the mounting plate 14, such as by one or more connectors 52 or fasteners that preferably extend from the block 50. In one presently preferred implementation, the connectors 52 are received in slots 54 in the mounting plate 14 and have enlarged heads 56 that overlie the mounting plate to retain the position of the block 50 adjacent to the mounting plate 14. One of the slots 54 may have a keyhole shape with a generally circular portion 60 large enough to receive a head 56 therethrough, and a reduced width portion (not shown) open to the circular portion 60 into which a shank 62 of the connector 52 may be slidably received. The other slots may be open to an edge 64 of the mounting plate 14 to slidably receive the shanks 62 of the other connectors 52. The block 50 may be contoured complementarily to the upper jacket 30 so that it may be generally uniformly engaged by the upper jacket 30 for more even load distribution. The block 50 may be formed of any metal or polymeric material suitable to withstand the forces that may be applied thereto by the steering column 12 during a steering column collapse.

The bracket 16 may be received generally within the channel 40 of the mounting plate 14 and preferably includes a central portion 70 disposed adjacent to the central portion 44 of the mounting plate 14 and having a cutout 71 that receives the block 50, and transverse flanges 72 extending away from the mounting plate 14 and including slots 73 (FIG. 1) through which one or more rods 74 may extend to facilitate operably coupling the steering column 12 to the bracket 16 in conventional manner. More specifically, the rod or rods 74 are coupled to one or more flanges 76 fixed on the upper jacket 30 and extend through the slots 73 in the flanges to couple the upper jacket 30 to the bracket 16. The upper jacket 30 may be temporarily released from the bracket 16 by actuation of a tilt lever 78 to permit angular adjustment of the steering column 12 by moving it relative to the slots 73. Preferably, the angular adjustment of the steering column 12 is limited in one direction by engagement of the upper jacket 30 with the reaction surface 18. Upon release of the tilt lever 78, the steering column 12 is locked in place relative to the bracket 16, as generally is known in the art. So even though the steering column 12 may be tilted relative to the bracket 16, the bracket 16 and steering column 12 are operably coupled so that the bracket 16 moves with the upper spindle 24a of the steering column 12 when it is displaced relative to the lower jacket 22. The tilt mechanism 13 may be of generally conventional construction and hence, will not be discussed further.

As best shown in FIG. 7, at least one opening 80 is formed in the bracket 16, and preferably, at least one opening 80 is formed for each of the slots 36 of the mounting plate 14. In assembly, the openings 80 are aligned with respective ones of the slots 36 in the mounting plate 14 so that a fastener or coupler 82 can be inserted through each of the slots 36 and a corresponding opening 80 in the bracket 16.

As best shown in FIG. 7, each fastener or coupler 82 preferably includes a shank 84 that extends through its associated slot 36 and opening 80, an enlarged head 86 that overlies a portion of the mounting plate 14, and a connecting portion 88 that overlies a portion of the bracket 16 to couple the bracket 16 to the mounting plate 14. The shank 84 preferably is relatively closely received in the opening 80 so that the coupler moves with the bracket 16. The coupler 82 may be a rivet wherein the connecting portion 88 is a deformed end of the rivet that is crimped or otherwise engaged with the bracket 16, or a nut and bolt wherein the connecting portion 88 is a nut secured on the bolt and engaging the bracket either directly or through a spacer, washer or the like. Similar spacers, washers or the like may be disposed between the head 86 and the mounting plate 14, if desired. Suitable fasteners or couplers 82 are commercially available from Alcoa under the trade name Huck Lock, such as a Huck Lock double locking blind rivet.

When initially assembled, and throughout normal use of the steering assembly 10, the head 86 of each coupler 82 overlies and preferably engages the contact surface 38 of the mounting plate 14 and the couplers 82 are installed to provide a clamping force suitable to retain the position of the steering column 12 throughout normal use and driving conditions of the vehicle. When a force is applied to the steering column 12, with at least a sufficiently high component of that force acting generally along an axis of the steering column 12, the bracket 16 is displaced relative to the mounting plate 14 and the couplers 82 are slidably moved within the slots 36. Once the heads 86 of the couplers 82 clear or slide past the contact surfaces 38, the clamping force holding the bracket 16 to the mounting plate 14 is reduced or relieved entirely since the thickness of all components clamped between the head 86 and connecting portion 88 of the couplers 82 is less when the couplers 82 are not in contact with the contact surface 38. In this way, the bracket 16 is releasably coupled to the mounting plate 14, although other constructions and arrangements could be employed, as desired.

Some of the energy of the collapsing steering column 12 initially is absorbed by way of initially displacing the couplers 82 from the contact surfaces 38. The force required to displace the couplers 82 from the contact surfaces 38 is a function of the surface areas of the engagement between the head 86 and contact surface 38, and the connecting portion 88 and the bracket 16, the static friction that must be overcome to initially move the couplers 88, and the dynamic or sliding friction that must be overcome to continue movement of the couplers 88. The force decreases as the surface area of engagement between the head 86 and contact surface 26 decreases, and as the axis of the coupler 82 moves away from the contact surface 38, until the head 86 fully clears the contact surface 38. Of course, based on the clamping force, friction, number of rivets, and other factors, the load or force required to initiate release of the steering column 12 can be adjusted as desired for a particular application.

Of course, other energy absorbing devices may be used in conjunction with the fasteners and contact surfaces, as desired. For example, a somewhat rigid but flexible bend strap 90 may be coupled to the bracket 16 and disposed around a pin 92 carried by the mounting plate 14 so that movement of the bracket 16 relative to the mounting plate 14 pulls and bends the strap 90 about the pin 92 to further absorb or dissipate energy in the collapsing steering assembly 10. Certain bend strap configurations are known in the art and may be employed if desired.

When a sufficiently high component of the force on the steering column 12 acts upwardly toward the mounting plate 14 as opposed to purely along the axis of the steering column 12, the lock of the tilt mechanism 13 can be overcome. When this happens, in the presently preferred implementation as shown in FIGS. 1-4 and 7, the rods 74 move within their slots 73 toward the mounting plate and the upper jacket 30 engages the stationary reaction surface 18 before the rods 74 reach the end of the slots 73. The relationship of the forces in the system are governed by the equation: $F_x = S = F_{strap} + F_z((l+a)/l)\mu$; where $F_{strap}$ is the force required to deform the bend strap, $F_z$ is the non-axial component of the input force R on the steering column, l is the distance between reaction forces $R_u$ and $R_L$, and a is the distance between the reaction $R_u$ and the cantilevered end of the steering column where the input force R acts, and $\mu$ is the effective coefficient of friction for the collapsing steering column.

In the presently preferred implementation, $R_u$ is the reaction at the area of engagement between the steering column 12 (more specifically its upper jacket 30) and the reaction surface 18, and $R_L$ is the reaction at the fixed pivot point 48. Since the reaction surface 18 is stationary, the position of the reaction load $R_u$ is maintained as the steering column collapses. Accordingly, the distance l remains constant as the steering column collapses, while the distance a decreases. Therefore, the force $F_x$ required to collapse the steering column 12 decreases as the steering column strokes, as graphically shown by the dashed line 98 in FIG. 6, and as demonstrated by the above noted formula. In the case where a vehicle occupant engages the steering wheel 11 during a vehicle impact event, providing the force R and causing the steering column 12 to collapse, the decreasing trend of the force $F_x$ lessens the resistance to steering wheel collapse and reduces the reaction forces on the occupant.

In contrast, without a stationary reaction surface 18, the steering column 12 can be displaced toward the mounting plate 14 until the rod 74 (or rods if more than one is used) engages an upper end of its slot 73. The off-axis load would then be borne by the area of engagement between a forward end 96 (as shown in FIG. 2 on a non-prior art steering assembly of this disclosure) of the upper jacket 30 and the adjacent portion of the lower jacket 22a of the steering column 12, and this would correspond to the reaction load $R_u$ in the above noted formula and as generally shown in FIG. 5. As the steering column strokes or collapses under the load, the forward end 96 of the upper jacket 30 moves toward the pivot connector 48, and so the reaction load $R_u$ likewise moves toward the pivot connector 48 which as previously noted corresponds to the reaction load $R_L$. Hence, in a conventional steering assembly, as the steering column collapses, the distance l between the two reaction points $R_u$ and $R_L$ would decrease while the distance a between the reaction point $R_u$ and the cantilevered end of the steering column would remain generally constant. As the distance l decreases, the axial force $F_x$ required to collapse the steering column would increase, as graphically shown by the line 100 in FIG. 6, and as demonstrated by the above noted formula.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. By way of example without limitation, while the reaction surface 18 has been shown as being retained by connectors 52 to the mounting plate 14, it could be otherwise retained, such as be a weld, adhesive or other fastener, or it may be formed in one-piece with the mounting plate 14. The reaction surface could also be provided on or carried by a different component in the area of the steering column 12, such as a portion of the instrument panel, as desired in a particular application. Of course, still other modifications and substitutions can be made. The invention is defined by the following claims.

What is claimed is:

1. A vehicle steering assembly, comprising:
   a steering column including a forward section and a rearward section movable relative to the forward section;
   a mounting plate adapted to be carried by the vehicle;
   a bracket releasably coupled to the mounting plate, end operably coupled to the rearward section of the steering column; and
   a stationary reaction surface fixed to the mounting plate, disposed between the mounting plate and the rearward section of the steering column, and complementarily contoured to said rearward section of the steering column to thereby engage the steering column during at least some events wherein the rearward section is displaced relative to the forward section.

2. The assembly of claim 1 which also includes a tilt mechanism which couples the steering column to the bracket to permit adjustment of the angular position of the steering column, and wherein the bracket includes at least one slot in which a portion of the tilt mechanism is received to permit movement of the steering column.

3. The assembly of claim 2 wherein the reaction surface provides a limit to the adjustment of the angular position of the steering column.

* * * * *